United States Patent [19]

Fauran et al.

[11] E Re. 29,607

[45] Reissued Apr. 11, 1978

[54] DERIVATIVES OF 5-HYDROXYMETHYL-3-SUBSTITUTED-2-OXAZOLIDINONES, PROCESS OF PREPARATION THEREOF AND THERAPEUTIC APPLICATION

[75] Inventors: Claude P. Fauran; Guy M. Raynaud, both of Paris; Rene A. Oliver, Vincennes, Val de Marne; Colette A. Douzon, Paris, all of France

[73] Assignee: Delalande S. A., Courbevoie, France

[21] Appl. No.: 692,744

[22] Filed: Jun. 4, 1976

Related U.S. Patent Documents

Reissue of:

[64] Patent No.: 3,655,687
Issued: Apr. 11, 1972
Appl. No.: 20,020
Filed: Mar. 16, 1970

[30] Foreign Application Priority Data

Mar. 18, 1969 United Kingdom ..... 14260/69

[51] Int. Cl.[2] ..... C07D 263/24
[52] U.S. Cl. ..... 260/307 C; 424/272
[58] Field of Search ..... 260/307 C

[56] References Cited

U.S. PATENT DOCUMENTS

| | | | |
|---|---|---|---|
| 2,437,388 | 3/1948 | Homeyer | 260/307 |
| 3,133,932 | 5/1964 | Horn et al. | 206/307 |
| 3,641,036 | 2/1972 | Fauran et al. | 260/268 C |
| 3,655,687 | 4/1972 | Fauran et al. | 260/307 C |

*Primary Examiner*—Raymond V. Rush
*Attorney, Agent, or Firm*—Blanchard, Flynn, Thiel, Boutell & Tanis

[57] ABSTRACT

Compounds of the formula

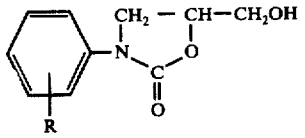

in which R is H, [Cl, F, $CH_3$ or $CF_3$] *m-F, p-F, o-F, p-Cl, p-$CH_3$, m-$CH_3$ or m-$CF_3$*. The compounds are prepared by cyclizing with ethyl carbonate, a compound of the formula

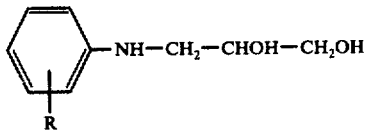

The compounds have anti-depressive, myorelaxing, tranquilizing, sedative, analgesic, anti-convulsive, anti-pyretic, anti-inflammatory and uricosuric activities.

5 Claims, No Drawings

DERIVATIVES OF 5-HYDROXYMETHYL-3-SUBSTITUTED-2-OXAZOLIDINONES, PROCESS OF PREPARATION THEREOF AND THERAPEUTIC APPLICATION

Matter enclosed in heavy brackets [ ] appears in the original patent but forms no part of this reissue specification; matter printed in italics indicates the additions made by reissue.

The present invention concerns novel derivatives of 5-hydroxymethyl-3-substituted-2-oxazolidinones, their process of preparation and their therapeutic application.

The compounds according to the present invention correspond to the general formula:

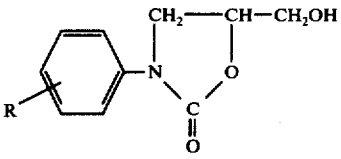

(I)

in which R represents [a hydrogen atom, a halogen atom, an alkyl radical having 1 to 4 carbon atoms or a trifluoromethyl radical] *m-F, p-F, o-F, p-Cl, p-$CH_3$, m-$CH_3$ or m-$CF_3$.*

The process for the preparation of the compounds according to the present invention comprises cyclising, by the action of ethyl carbonate, a 1-phenylamino-2,3-propanediol of the general formula:

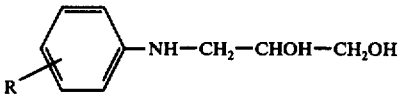

(II)

in which R has the same significance as in Formula I.

The following preparation is given, by way of non-limitative example, to illustrate the present invention.

EXAMPLE 5-hydroxymethyl-3-(m-trifluoromethyl phenyl)-2-oxazolidinone. (Code No. 68121)

59 g. of 1-(m-trifluoromethyl phenylamino)-2,3-propanediol and 118 g. of ethyl carbonate are introduced into a distillation apparatus. The mixture is progressively heated to about 110° C. when dissolution is obtained. Then, 12 ml. of a 5% solution of sodium methylate in methanol is added thereto. The distillation of the ethanol formed during the course of the reaction is then observed. Upon completion thereof any excess ethyl carbonate is removed under reduced pressure and the residue obtained is crystallized in isopropyl ether.

Melting point = 80° C.

Yield = 80%

Empirical formula = $C_{11}H_{10}F_3NO_3$

Elementary analysis.—Calculated percent: C, 50.58; H, 3.86; N, 5.36. Found percent: C, 50,74; H, 3.76; N, 5.56.

The compounds listed in the following table have been prepared according to the process of the above example:

TABLE I

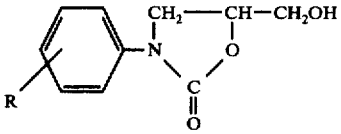

| Code No. | R | Empirical formula | Mol wt. | M.P. ° C. | Yield, percent | Elementary analysis, percent Calculated C | H | N | Found C | H | N |
|---|---|---|---|---|---|---|---|---|---|---|---|
| 67360 | H | $C_{10}H_{11}NO_3$ | 192.20 | 129 | 75 | 62.16 | 5.74 | 7.25 | 62.20 | 5.87 | 7.40 |
| 68292 | m-F | $C_{10}H_{10}FNO_3$ | 211.19 | 96 | 87 | 56.87 | 4.77 | 6.63 | 56.88 | 4.92 | 6.79 |
| 69155 | p-F | $C_{10}H_{10}FNO_3$ | 211.19 | 116 | 68 | 56.87 | 4.77 | 6.63 | 56.97 | 4.77 | 6.83 |
| 69275 | o-F | $C_{10}H_{10}FNO_3$ | 211.19 | 94 | 60 | 56.87 | 4.77 | 6.63 | 56.75 | 4.73 | 6.67 |
| 6922 | p-Cl | $C_{10}H_{10}ClNO_3$ | 227.64 | 104 | 55 | 52.75 | 4.43 | 6.15 | 53.01 | 4.53 | 6.05 |
| 69204 | p-$CH_3$ | $C_{11}H_{13}NO_3$ | 207.22 | 145 | 66 | 63.75 | 6.32 | 6.76 | 63.93 | 6.10 | 6.88 |
| 69276 | m-$CH_3$ | $C_{11}H_{13}NO_3$ | 207.22 | 76 | 70 | 63.75 | 6.32 | 6.76 | 63.70 | 6.43 | 6.78 |
| [ 9217 | o-$CH_3$ | $C_{11}H_{13}NO_3$ | 207.22 | 64 | 69 | 63.75 | 6.32 | 6.76 | 63.71 | 6.37 | 6.88] |

The compounds of Formula I experimentally exert anti-depressive. myorelaxing, tranquillising, sedative, analgesic, anti-convulsive, anti-pyretic, anti-inflammatory and uricosuric activities. Moreover, their toxic effects on animals in the laboratory are little marked.

(1) Anti-depressive properties.—The compounds of Formula I are capable of opposing hypothermia and the ptosis provoked by reserpine in the rat and the mouse, as well as the ulcers provoked by reserpine in the rat. Moreover, they oppose the catalepsy provoked by prochlorperazine in the rat.

By way of example, several results obtained are listed in the following table:

TABLE II

| Code No. | Hypothermia Dose[1] | Hypothermia Effect, ° C. | Ptosis Rat Dose[1] | Ptosis Rat Effect, percent | Ptosis Mouse Dose[1] | Ptosis Mouse Effect, percent | Ulcers Dose[1] | Ulcers Effect, percent |
|---|---|---|---|---|---|---|---|---|
| 67360 | 200 | −3.3 | 200 | 70 | 200 | 55 | — | — |
| 68121 | 100 | −3.3 | — | — | 100 | 45 | 100 | 77 |
| 68292 | 100 | −2.6 | 100 | 75 | 100 | 50 | 100 | 85 |
| 6922 | — | — | 100 | 45 | 100 | 55 | — | — |
| 69201 | 100 | −2.9 | — | — | — | — | — | — |

TABLE II-continued

| Code No. | Hypothermia Dose[1] | Hypothermia Effect, °C. | Ptosis Rat Dose[1] | Ptosis Rat Effect, percent | Ptosis Mouse Dose[1] | Ptosis Mouse Effect, percent | Ulcers Dose[1] | Ulcers Effect, percent |
|---|---|---|---|---|---|---|---|---|
| 69276 | — | — | — | — | — | — | 100 | 50 |

[1]Expressed in mg./kg./p.o.

(II) Myorelaxing properties.—The compounds of Formula I provoke in the mouse the loss of the righting reflex and inhibit the traction reflexes and the maintenance on a rotating rod.

By way of example, the results obtained with two compounds of Formula I are listed in the following table:

TABLE III

| Code No. | Traction test, $ED_{50}$ | Rotating rod test, $ED_{50}$ |
|---|---|---|
| 67360 | 300 mg./kg./p.o. | 160 mg./kg./p.o. |
| 68121 | | 110 mg./kg./p.o. |

(III) Tranquillising and sedative action.—These effects are shown by a diminution of exploration curiosity in the enclose of an actimetric cage and of escape in an open field. The compound of Formula I reduce the aggressiveness provoked in the passage of an electric current and lower the body temperature of animals. The narcotic effects of penthiobarbital are equally reinforced.

The results obtained with two compounds of Formula I are listed in the following table:

TABLE IV

| Code No. | Actimetric cage Dose[1] | Actimetric cage Effect, percent | Evasion test Dose[1] | Evasion test Effect, percent | Potentialisation penthiobarbital Dose[1] | Potentialisation penthiobarbital Effect, percent |
|---|---|---|---|---|---|---|
| 67360 | 90 | 50 | 200 | 70 | 200 | 80 |
| 68121 | 100 | 70 | — | — | 80 | 50 |

[1]Expressed in mg./kg./p.o.

(IV) Analgesic activity.—This activity is particularly pronounced against the painful stretching provoked in the mouse by the intraperitoneal administration of phenyl benzoquinone or acetic acid.

The results obtained with two compounds of Formula I are shown in the following table:

TABLE V

| Code No. | Protection against phenylbenzoquinone Dose in mg./kg./p.o. | Protection against phenylbenzoquinone Effect, percent |
|---|---|---|
| 67360 | 90 | 50 |
| 68121 | 45 | 50 |

(V) Anti-convulsive properties.—The compounds of Formula I exert in the mouse an antagonism against the lethal effects of cardiazol, strychnine and nicotine. They equally show activity against the tonic hyperextension of an excessive electric shock.

By way of example, the results obtained with several compounds of Formula I are listed in the following table:

TABLE VI

| Code No. | Antagonism against Cardizol Dose[1] | Cardizol Effect, percent | Strychnine Dose[1] | Strychnine Effect, percent | Nicotine Dose[1] | Nicotine Effect, percent |
|---|---|---|---|---|---|---|
| 67360 | — | — | 140 | 50 | — | — |
| 68121 | 120 | 50 | 100 | 50 | 100 | 80 |
| 68292 | — | — | 100 | 70 | 100 | 60 |
| 6922 | — | — | 100 | 100 | — | — |
| 69155 | — | — | 100 | 65 | — | — |

[1]Expressed in mg./kg./p.o.

(VI) Anti-pyretic action.—This action is manifested by a diminution of the experimental fever provoked by the administration of barm in the cat.

(VII) Anti-inflammatory effect.—The under-plantar oedema provoked in the rat by the administration of carraghenine is diminished by the compounds of the present invention.

(VIII) Uricosuric action.—After repeated oral administration in the rat, the compounds of Formula I provoke an augmentation of the urinary eliminations of uric acid.

In consequence of the results shown above, and the values appearing in the following table, the difference between the pharmacologically-active dose and the lethal dose is sufficiently great to enable the compounds of Formula I to be utilised in therapeutics.

TABLE VII

| Code No. | LD50 P.O. (mouse,) mg./kg. |
|---|---|
| 67360 | >1600 |
| 68121 | 1400 |
| 68292 | 1500 |
| 6922 | 1050 |
| 69155 | 1200 |
| 69204 | >4000 |
| 69276 | 1850 |

The compounds of Formula I are indicated in the case of depression and neurosis by depressive and anxious components. They equally possess a favourable effect against contractural and inflammatory pains, with or without hyperthermia.

They may be administered in the form of tablets and gelules containing 50 to 250 mg. of active ingredient.

Hence, according to the present invention there is also provided a therapeutic composition comprising a compound of Formula I together with a therapeutically-acceptable carrier.

What we claim is:

[1. A compound of the formula

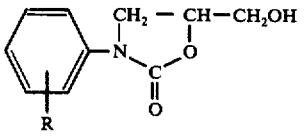

in which R is selected from the group consisting of hydrogen, chlorine, fluorine, methyl and trifluoromethyl.]

[2. A compound as claimed in claim 1, in which R is chlorine or fluorine.]

*3. A compound of the formula*

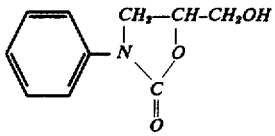

*4. A compound of the formula*

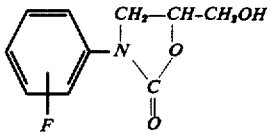

*5. A compound of the formula*

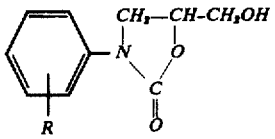

*in which R is selected from the group consisting of p-methyl and m-methyl.*

*6. A compound of the formula*

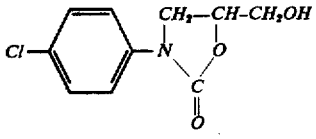

*7. A compound of the formula*

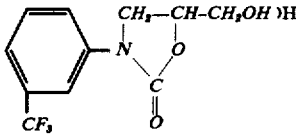

* * * * *

UNITED STATES PATENT AND TRADEMARK OFFICE

CERTIFICATE OF CORRECTION

PATENT NO. : RE 29607

DATED : April 11, 1978

INVENTOR(S) : Claude P. Fauran et al

It is certified that error appears in the above-identified patent and that said Letters Patent are hereby corrected as shown below:

Column 6, line 22; (line 1 of the formula) change

"CH-$CH_2$OH)H" to ---CH-$CH_2$OH---.

Signed and Sealed this

*Fifteenth* Day of *August 1978*

[SEAL]

*Attest:*

RUTH C. MASON
*Attesting Officer*

DONALD W. BANNER
*Commissioner of Patents and Trademarks*